United States Patent
Liu

(10) Patent No.: US 11,842,148 B2
(45) Date of Patent: Dec. 12, 2023

(54) METHOD FOR TRAINING READING COMPREHENSION MODEL, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventor: Kai Liu, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 497 days.

(21) Appl. No.: 17/130,299

(22) Filed: Dec. 22, 2020

(65) Prior Publication Data
US 2021/0383062 A1 Dec. 9, 2021

(30) Foreign Application Priority Data
Jun. 4, 2020 (CN) .......................... 202010498795.9

(51) Int. Cl.
*G06F 40/20* (2020.01)
*G06N 20/00* (2019.01)
*G06F 40/289* (2020.01)

(52) U.S. Cl.
CPC ............. *G06F 40/20* (2020.01); *G06N 20/00* (2019.01); *G06F 40/289* (2020.01)

(58) Field of Classification Search
CPC ........................... G06F 40/289; G05B 13/0285
See application file for complete search history.

(56) References Cited

U.S. PATENT DOCUMENTS 7,346,489 B1 * 3/2008 Bever ................... G06F 40/117
704/4

FOREIGN PATENT DOCUMENTS

| CN | 109685212 A | 4/2019 |
| CN | 111079938 A | 4/2020 |
| JP | 0445729 A1 * | 2/1991 |
| JP | 0445729 A1 * | 9/1991 |
| JP | 2018525734 A | 9/2018 |
| WO | WO-2017222738 A1 * | 12/2017 ......... G06F 16/3329 |

OTHER PUBLICATIONS

Zhang, et al., "A GA-BP Hybrid Algorithm Based ANN Model for Wind Power Prediction," 2016 the 4th IEEE International Conference on Smart Energy Grid Engineering. (Year: 2016).*

(Continued)

*Primary Examiner* — Feng-Tzer Tzeng
(74) *Attorney, Agent, or Firm* — Lippes Mathias LLP

(57) ABSTRACT

The present disclosure discloses a method for training a reading comprehension model, and relates to a field of natural language processing and deep learning technologies. The detailed implementing solution includes: respectively inputting a first training sample of the reference field into a reference reading comprehension model of a reference field and a target reading comprehension model of a target field, to obtain first output data output by the reference reading comprehension model and second output data output by the target reading comprehension model; and performing a first training process on the target reading comprehension model based on a difference between the first output data and the second output data.

12 Claims, 6 Drawing Sheets

(56) References Cited

OTHER PUBLICATIONS

Zhang, et al., "A GA-BP Hybrid Algorithm Based ANN Model for Wind Power Prediction," the 4th IEEE International Conference on Smart Energy Grid Engineering, 2016.—see attached reference in the previous Office action. (Year: 2016).*
Office Action for Japanese Application No. 2021-067110, dated Apr. 5, 2022, 3 pages.
Yu Cao, "Unsupervised Domain Adaptation on Reading Comprehension", Nov. 13, 2019, 9 pages.
Xiaojun Wan, "Co-Training for Cross-Lingual Sentiment Classification", Proceedings of the 47th Annual Meeting of the ACL, pp. 235-243, Aug. 2, 2009.
Kuniaki Saito et al., "Asymmetric Tri-training for Unsupervised Domain Adaptation", arXiv.org, Feb. 27, 2017, 12 pages.
Extended European Search Report for Application No. 20216677.3, dated Aug. 9, 2021, 9 pages.
Ying Xu et al., "Forget Me Not: Reducing Catastrophic Forgetting for Domain Adaption in Reading Comprehension", Nov. 1, 2019, Association for the Advancement of Artificial Intelligence, 9 pages.
Zhiqing Sun, "MobilBERT: a Compact Task-Agnostic BERT for Resource-Limited Devices", Apr. 14, 2020, 13 pages.
OA for KR application 10-2021-0069232, dated Sep. 14, 2023, 7 pgs.
OA for KR application 10-2021-0069232, dated Sep. 14, 2023,—English translation, 8 pgs.
Clark, "Bam! Born-Again Multi-Task Networks for Natural Language Understanding", arXiv: 1907.04829v1 [cs.CL] Jul. 10, 2019 7 pgs.
Xu, "Multi-task Learning with Sample Re-weighting for Machine Reading Comprehension", arXiv: 1809.06963v3 [cs.CL] Mar. 31, 2019 13 pgs.
Terminate deep learning models early, Feb. 1, 2020, 9 pgs.
Terminate deep learning models early—English translation, 11 pgs.

* cited by examiner

METHOD FOR TRAINING READING COMPREHENSION MODEL, ELECTRONIC DEVICE, AND STORAGE MEDIUM

CROSS-REFERENCE TO RELATED APPLICATION

This application is based upon and claims priority to and benefits of Chinese Patent Application Serial No. 202010498795.9, filed the State Intellectual Property Office of P. R. China on Jun. 4, 2020, the entire content of which is incorporated herein by reference.

FIELD

Embodiments of the present disclosure relate to a field of data processing technologies and particularly to a field of natural language processing and deep learning technologies, and especially relate to a method for training a reading comprehension model, an electronic device, and a storage medium.

BACKGROUND

Machine reading comprehension is a classic task in a field of NLP (natural language processing). That is, when a text paragraph is given, and a question is asked for the text paragraph, an answer may be a text segment in the text paragraph. In an actual application, the machine reading comprehension may be implemented by utilizing a reading comprehension model obtained by training.

In order to enable the reading comprehension model to learn knowledge from multiple fields, a reading comprehension model is generally trained by employing training data from multiple fields.

SUMMARY

According to embodiments of the present disclosure, a method for training a reading comprehension model is provided. The method includes: obtaining a target reading comprehension model of a target field and a reference reading comprehension model of a reference field; inputting a first training sample of the reference field into the reference reading comprehension model to obtain first output data output by the reference reading comprehension model; inputting the first training sample into the target reading comprehension model to obtain second output data output by the target reading comprehension model; and performing a first training process on the target reading comprehension model based on a difference between the first output data and the second output data.

According to embodiments of the present disclosure, an electronic device is provided. The electronic device includes: at least one processor and a memory. The memory is communicatively coupled to the at least one processor. The memory is configured to store instructions executed by the at least one processor. When the instructions are executed by the at least one processor, the at least one processor is caused to implement the method for training the reading comprehension model according to the above embodiments of the present disclosure.

According to embodiments of the present disclosure, a non-transitory computer readable storage medium is provided. The non-transitory computer readable storage medium has computer instructions stored thereon. The computer instructions are configured to enable a computer to execute the method for training the reading comprehension model according to above embodiments of the present disclosure.

It should be understood that, description in summary of the present disclosure does not aim to limit a key or important feature in embodiments of the present disclosure, and does not used to limit the scope of the present disclosure. Other features of the present disclosure will be easily understood by following descriptions.

BRIEF DESCRIPTION OF THE DRAWINGS

The accompanying drawings are used for better understanding the solution and do not constitute a limitation of the present disclosure.

DETAILED DESCRIPTION

Description will be made below to exemplary embodiments of the present disclosure with reference to accompanying drawings, which includes various details of embodiments of the present disclosure to facilitate understanding and should be regarded as merely examples. Therefore, it should be recognized by the skilled in the art that various changes and modifications may be made to the embodiments described herein without departing from the scope and spirit of the present disclosure. Meanwhile, for clarity and conciseness, descriptions for well-known functions and structures are omitted in the following description.

Description will be made below to a method for training a reading comprehension model, a method for reading comprehension processing, an apparatus for training a reading comprehension model, an apparatus for reading comprehension processing, an electronic device, and a storage medium according to embodiments of the present disclosure with reference to accompanying drawings.

Figure 1:
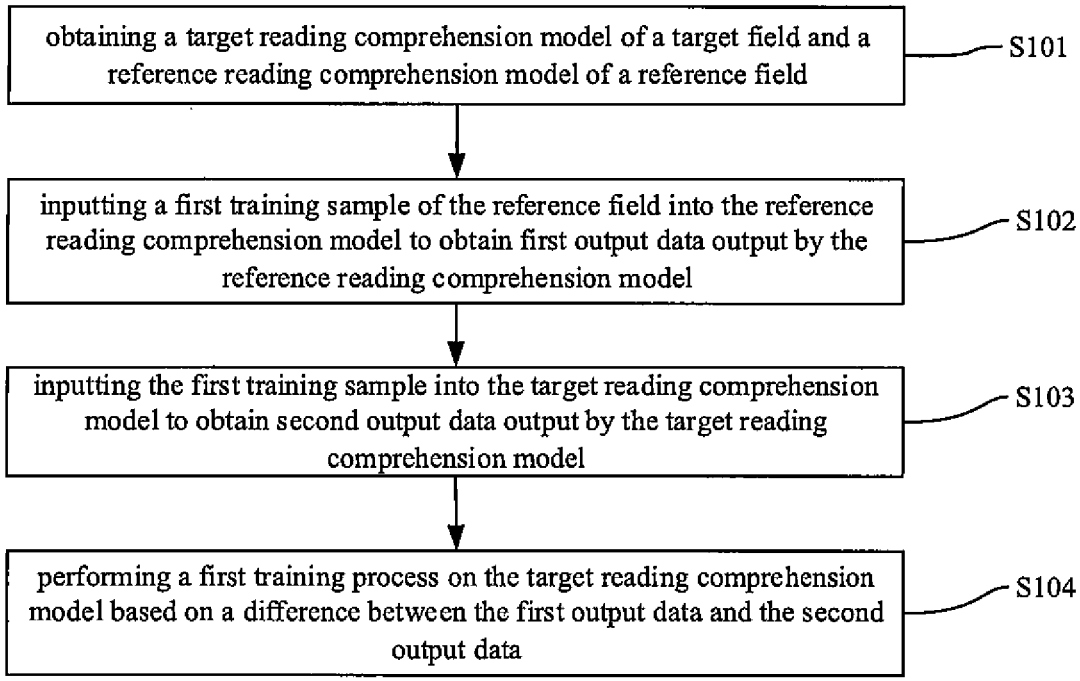
FIG. 1 is a flow chart according to a first embodiment of the present disclosure.

FIG. 1 is a flow chart illustrating a method for training a reading comprehension model according to embodiments of the present disclosure. It should be noted that, the method for training a reading comprehension model according to embodiments of the present disclosure may be applied to an apparatus for training a reading comprehension model according to embodiments of the present disclosure. The apparatus may be configured in an electronic device. The electronic device may be an electronic device with a reading comprehension function, such as a smart phone, a tablet, a PAD (portable android device), a personal digital assistant, a smart speaker and other hardware device with an operating system.

At block 101, a target reading comprehension model of a target field and a reference reading comprehension model of a reference field are obtained.

For example, the target reading comprehension model of the target field and the reference reading comprehension model of the reference field may be obtained by the electronic device.

The target reading comprehension model refers to a reading comprehension model that has learned knowledge of the target field, and may process reading comprehension content of the target field. Accordingly, the reference reading comprehension model refers to a reading comprehension model that has learned knowledge of the reference field, and may process reading comprehension content of the reference field.

In embodiments of the present disclosure, as a possible implementation, the target reading comprehension model and the reference reading comprehension model are trained by training with training samples in corresponding fields respectively, such that each reading comprehension model may correctly find out an answer to a question from a paragraph. The training sample may be generally represented as a set $\{(q, p, s_g)\}$, where q represents a question, p represents a paragraph, and $s_g$ represents position information of an answer to the question q in the paragraph p. The answer in the paragraph p is generally represented as a continuous text. Therefore, the answer is generally marked as information $s_g$=[start, end] representing a text span, where the start represents a start position of the continuous text, and the end represents an end position of the continuous text.

For example, the paragraph p includes the followings. The Chamber of Commerce and Industry reported that consumer confidence rose to 78.1 in December, significantly higher than 72 in November. According to the Wall Street Journal, 2013 was the best year for the US stock market since 1995. In this year, a wise way to invest in the US stock market was to chase after "stupid money". The so-called "stupid money" strategy simply refers to a common combination of buying and holding American stocks. This strategy is much better than the hedge funds and other more complex investment methods used by professional investors.

A first question q is: what is the "stupid money" strategy? The reading comprehension model selects valuable words related to the first question q for the paragraph p. For example, an answer $s_g1$ to the first question is: the so-called "stupid money" strategy refers to simply a common combination of buying and holding American stocks. A second question q is: what is the consumer confidence index in December? The reading comprehension model selects valuable words related to the second question q for the paragraph p. For example, an answer $s_g2$ to the second question is: 78.1.

In some embodiments of the present disclosure, as a possible implementation, during a process that the reading comprehension model correctly selects the answer to the question in the paragraph, and the reading comprehension model searches for effective information from a text based on an attention mechanism after coding the text, and finally outputs the information.

Figure 2:
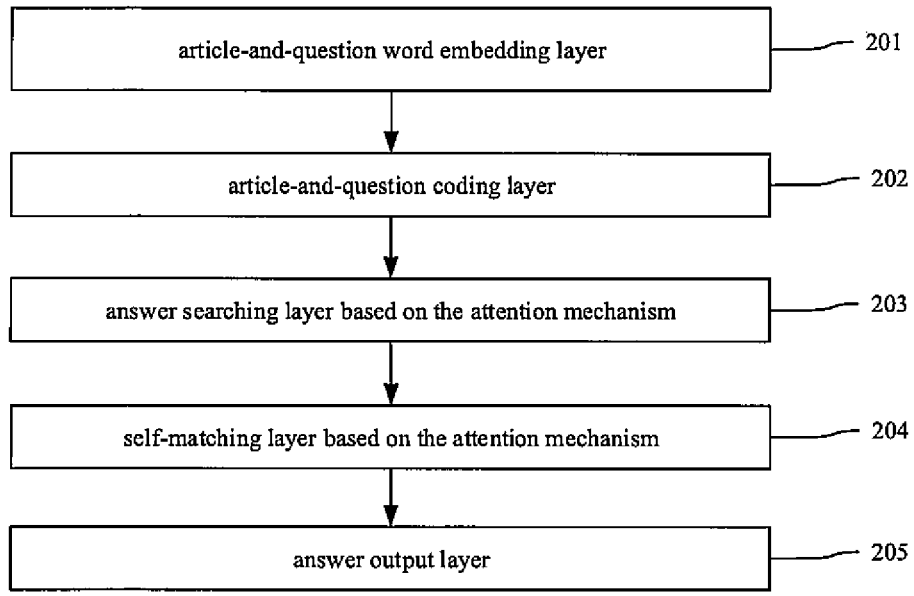
FIG. 2 is a block diagram illustrating a hierarchical structure of a reading comprehension model.

As illustrated in FIG. 2, FIG. 2 illustrates a hierarchical structure of a reading comprehension model. The whole model includes five layers of network, an article-and-question word embedding layer, an article-and-question coding layer, an answer searching layer based on the attention mechanism, a self-matching layer based on the attention mechanism, and an answer output layer. Detailed implementation may be as followings.

The article-and-question word embedding layer is illustrated at block 201.

In embodiments of the present disclosure, at the article-and-question word embedding layer, both an article and a question are divided into word-level word vectors respectively and into character-level word vectors respectively. In an embodiment, each of the two kinds of word vectors may use a pre-trained Chinese word vector type. The dimensions of each of the two kinds of word vectors are 300 dimensions. The character-level word vector may be input into a bidirectional cyclic neural network, and a final hidden state of the bidirectional cyclic neural network is used as a final character-level word vector. The number of hidden units in the bidirectional cyclic network is 48.

The article-and-question coding layer is illustrated at block 202.

In embodiments of the present disclosure, at the article-and-question coding layer, the word vectors of the article and the question are input into a three-layer GRU (gate recurrent unit) network to encode the word vectors. The GRU network is a kind of a recurrent neural network (RNN). Dropout is used with a ratio of 0.5. The number of hidden units in the GRU network is 48.

The answer searching layer based on the attention mechanism is illustrated at block 203.

In some embodiments of the present disclosure, at the answer searching layer based on the attention mechanism, an attention vector of the question to the article is calculated by using a scaled dot-product attention mechanism, and then the attention vector is input into a single-layer GRU network to obtain an article coding vector based on question attention. Dropout is used with a ratio of 0.5. The number of the hidden units in the GRU network is 48.

The self-matching layer based on the attention mechanism is illustrated at block 204.

In some embodiments of the present disclosure, at the self-matching layer based on the attention mechanism, a self-matching attention vector (also called self-attention vector) of the article coding vector based on question attention generated at the answer searching layer is calculated by using the scaled dot dot-product attention mechanism. Then the obtained self-matching attention vector is input into a single-layer GRU network, and finally a self-matching article vector including article information is obtained. Dropout is used with a ratio of 0.5. The number of hidden units in the GRU network is 48.

The answer output layer is illustrated at block 205.

In some embodiments of the present disclosure, firstly, a question coding attention vector is calculated as an initial hidden vector of a pointer network by employing the scaled dot-product attention mechanism. Then, the pointer network is constructed, and probabilities of words as a start position and an end position in the self-matching article vector are calculated by using the attention mechanism as a pointer in the network. Finally, a word corresponding to the highest probability for the start position is selected from the article as the start position of the answer, and a word corresponding to the highest probability for the end position is selected from the article as the end position of the answer. Since each question corresponds to multiple articles, all the articles may be traversed to select the best answer in a single article, and then the best answer overall is selected from all the articles.

Dropout is used with a ratio of 0.5. The number of hidden units in the GRU network is 48.

At block S102, a first training sample of the reference field is input into the reference reading comprehension model to obtain first output data output by the reference reading comprehension model.

In other words, after the reference reading comprehension model of the reference field is obtained, the first training sample of the reference field may be input into the reference reading comprehension model to obtain the first output data output by the reference reading comprehension model.

At block S103, the first training sample is input into the target reading comprehension model to obtain second output data output by the target reading comprehension model.

In other words, after the target reading comprehension model of the target field is obtained, the first training sample of the reference field may be input into the target reading comprehension model to obtain the second output data output by the target reading comprehension model.

At block S104, a first training process is performed on the target reading comprehension model based on a difference between the first output data and the second output data.

In some embodiments of the present disclosure, a model parameter of the target reading comprehension model may be adjusted based on the first output data, such that the second output data is as close as possible to the first output data, thus implementing the first training process of the target reading comprehension model. Training of the target reading comprehension model may be performed through deep learning. Comparing with other machine learning method, the deep learning may perform better on big data.

With the method for training the reading comprehension model according to embodiments of the present disclosure, the target reading comprehension model of the target field and the reference reading comprehension model of the reference field are obtained. The first training sample of the reference field is input into the reference reading comprehension model to obtain the first output data output by the reference reading comprehension model, and the first training sample is input into the target reading comprehension model to obtain the second output data output by the target reading comprehension model. The first training process is performed on the target reading comprehension model based on the difference between the first output data and the second output data. With the method, by determining the difference between the first output data and the second output data, it may be determined that the target reading comprehension model may absorb data of the reference field, such that more multi-field data which is most effective for the target reading comprehension model may be reserved in the target reading comprehension model, and the method for training the reading comprehension model may be superior to a training result obtained simply relying on model training data.

Figure 3:
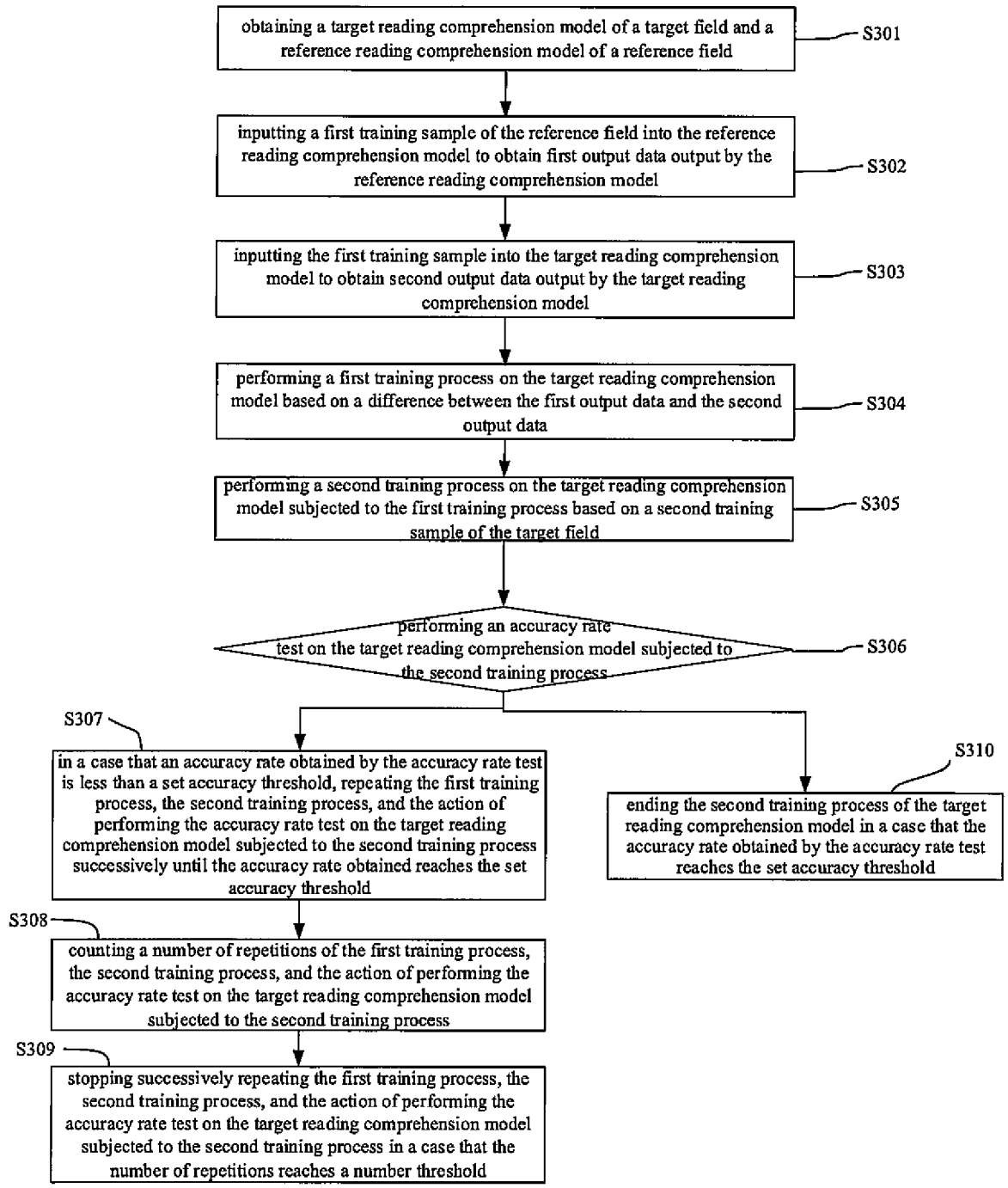
FIG. 3 is a flow chart according to a second embodiment of the present disclosure.

After the above training process is performed, in order to further improve the training effect, a second training process may be performed to strengthen the knowledge of the target field after the first training process is performed to learn the knowledge of the reference field, such that the target reading comprehension model may get a well training effect in both the target field and the reference field. FIG. 3 is a flow chart illustrating a method for training a reading comprehension model according to some embodiments of the present disclosure. As illustrated in FIG. 3, the method for training the reading comprehension model may include the followings.

At block S301, a target reading comprehension model of a target field and a reference reading comprehension model of a reference field are obtained.

In some embodiments of the present disclosure, at least two initial reading comprehension models may be obtained. One of the at least two initial reading comprehension models is trained by employing a first training sample of the reference field to obtain the reference reading comprehension model. The other one of the at least two initial reading comprehension models is trained by using a second training sample of the target field to obtain the target reading comprehension model.

The initial reading comprehension model may be understood as an untrained model.

There may be multiple reference fields. Each reference field corresponds to a reference reading comprehension model.

That is to say, at least two untrained models may be obtained. The first training sample of the reference field may be input into one of the at least two untrained models for training to obtain an initial reference reading comprehension model. The second training sample of the target field may be input to into the other one of the at least two untrained models for training to obtain an initial target reading comprehension model.

For example, two untrained models are obtained, i.e., an A1 model and a B1 model. A training sample of a field A is input into the A1 model. Model parameter adjustment is performed on the A1 model based on the training sample of the A field and a neural network backpropagation algorithm to obtain the initial reference reading comprehension model. A training sample of a B field is input into the B1 model. Model parameter adjustment is performed on the B1 model based on the training sample of the B field and the neural network backpropagation algorithm to obtain the initial target reading comprehension model.

The neural network backpropagation algorithm is essentially a gradient descent method. A learning process of the neural network backpropagation algorithm consists of a forward propagation process and a backward propagation process. In the forward propagation process, input information is processed layer by layer from an input layer to a hidden layer, and transmitted to an output layer to obtain an output. When an expected output value is not obtained at the output layer, a sum of squares of errors between the output and an expectation is taken as a target function, and then back propagation process is performed. Partial derivatives of the target function with respect to weights of respective neurons are obtained layer by layer, to form a gradient of the target function with respect to a weight vector as a basis for modifying the weights. The weight vector consists of the weights of respective neurons. The learning of the network is completed during modifying the weights. When the error reaches an expected value, the network learning ends.

At block S302, a first training sample of the reference field is input into the reference reading comprehension model to obtain first output data output by the reference reading comprehension model.

In other words, after the reference reading comprehension model, i.e., the initial reference reading comprehension model, of the reference field is obtained at block S301, since the reference reading comprehension model has learned the knowledge of the reference field, the first training sample of the reference field may be input into the reference reading comprehension model, such that the reference reading comprehension model outputs the first output data. The first output data may be understood as a probability that an answer is at each position in a paragraph provided by the first training sample. The probability is obtained by performing answer prediction, using the reference reading comprehension model, on the question provided by the first training sample based on the paragraph provided by the first training sample.

At block S303, the first training sample is input into the target reading comprehension model to obtain second output data output by the target reading comprehension model.

In other words, after the target reading comprehension model, i.e., the initial target reading comprehension model, of the target field is obtained at block S301, the first training sample of the reference field may be input into the target reading comprehension model, such that the target reading comprehension model outputs the second output data. The second output data may be understood as a probability that an answer is at each position in a paragraph provided by the first training sample. The probability is obtained by performing answer prediction, using the target reading comprehension model, on the question provided by the first training sample based on the paragraph provided by the first training sample.

At block S304, a first training process is performed on the target reading comprehension model based on a difference between the first output data and the second output data.

In embodiments of the present disclosure, after the first output data output by the reference reading comprehension model and the second output data output by the target reading comprehension model are obtained, the first training process may be performed on the target reading comprehension model based on the difference between the first output data and the second output data.

For example, based on a difference between the probability obtained based on the first training sample by using the reference reading comprehension model and the probability obtained based on the first training sample by using the target reading comprehension model, the model parameter of the target reading comprehension model may be adjusted by using a training method such as the neural network backpropagation algorithm, such that the probability obtained based on the first training sample of the reference field by using the target reading comprehension model gets close to the probability obtained based on the first training sample of the reference field by using the reference reading comprehension model. The first training process for the target reading comprehension model may be completed until the two probabilities have a minimum difference.

At block S305, a second training process is performed on the target reading comprehension model subjected to the first training process based on a second training sample of the target field.

In some embodiments of the present disclosure, in order to improve the effect of the target reading comprehension model in the target field, the second training sample of the target field may be input into the target reading comprehension model subjected to the first training process. The target reading comprehension model subjected to the first training process is further trained by employing the second training sample of the target field based on the neural network backpropagation algorithm, such that the trained target reading comprehension model is a common model for the target field and the reference field. After the target reading comprehension model is subjected to the first training process, the knowledge of the reference field may be learnt on the one hand, and the knowledge of the target field is weakened during the first training process on the other hand, thus causing a poor performance of the target reading comprehension model in the target field. Therefore, in this embodiment, the second training process is further performed after the first training process, to enhance the knowledge of the target field.

At block 306, an accuracy rate test is performed on the target reading comprehension model subjected to the second training process.

For example, after the second training process is performed on the target reading comprehension model subjected to the first training process, the target reading comprehension model subjected to the second training process may be tested to obtain an accuracy rate, and it is determined whether the accuracy rate obtained by the test reaches a set accuracy threshold.

A test set may be used to test the target reading comprehension model subjected to the second training process. The test set is used to test the performance of the target reading comprehension model subjected to the second training process. The test set may account for 25% of total samples. When a total number of samples is small, a small part of the samples is remained as the test set. For example, a K-fold cross-validation method is performed on remained N samples. That is, the samples is disrupted and evenly divided into K subsamples. Then, K−1 subsamples are selected from the N samples in turn for training, and a single subsample is remained for testing. That is, the process of selecting the K−1 subsamples are repeated for K times. In each repetition, a sum of squares of prediction errors is calculated. An average of the K sums of squares of prediction errors obtained in the k repetitions is finally determined as a basis for selecting a model structure. Particularly, the K may be selected as N, which is leave-one-out cross-validation method.

At block S307, in a case that an accuracy rate obtained by the accuracy rate test is less than a set accuracy threshold, the first training process, the second training process, and the action of performing the accuracy rate test on the target reading comprehension model subjected to the second training process are repeated successively until the accuracy rate obtained reaches the set accuracy threshold.

It should be noted that, in the case that the accuracy rate fails to reach the set accuracy threshold, the first training process, the second training process, and the action of performing the accuracy rate test on the target reading comprehension model subjected to the second training process are repeated successively. In this way, the knowledge of the reference field may be learned in the target reading comprehension model, and it may be avoided to weaken the performance in the target field. Through multi-energy cycle, performance balance may be achieved and a well state may be reached in the target field.

At block S308, a number of repetitions of the first training process, the second training process, and the action of performing the accuracy rate test on the target reading comprehension model subjected to the second training process is counted.

For example, in order to enable effect of the target reading comprehension model in the second training process to converge, after the accuracy rate reaches the set accuracy threshold by successively repeating the first training process, the second training process, and the action of performing the accuracy rate test on the target reading comprehension model subjected to the second training process, the number of times of repeating the first training process, the second training process, and the action of performing the accuracy rate test on the target reading comprehension model subjected to the second training process may be counted.

At block S309, successively repeating the first training process, the second training process, and the action of performing the accuracy rate test on the target reading comprehension model subjected to the second training process is stopped in a case that the number of repetitions reaches a number threshold.

In other words, when the number of repetitions reaches the number threshold, and the effect of the target reading comprehension model in the second training process converges, successively repeating the first training process, the second training process, and the action of performing the accuracy rate test on the target reading comprehension model subjected to the second training process is stopped.

At block S310, the second training process of the target reading comprehension model is ended in a case that the accuracy rate obtained by the accuracy rate test reaches the set accuracy threshold.

With the method for training the reading comprehension model according to embodiments of the present disclosure, by means of iterative distillation layer by layer, reading comprehension models of multiple reference fields learn from each other during the iterative process. The target reading comprehension model may absorb data from the multiple reference fields, such that more multi-field data which is most effective for the target reading comprehension model is reserved in the target reading comprehension model, and the method for training the target reading comprehension model may be better than the method simply relying on the training result obtained by the model training data. In a practical application, there is no need to change a formed reading comprehension model, further an apparatus and a process applying an existing model may not be affected, thus application cost is low.

Figure 4:
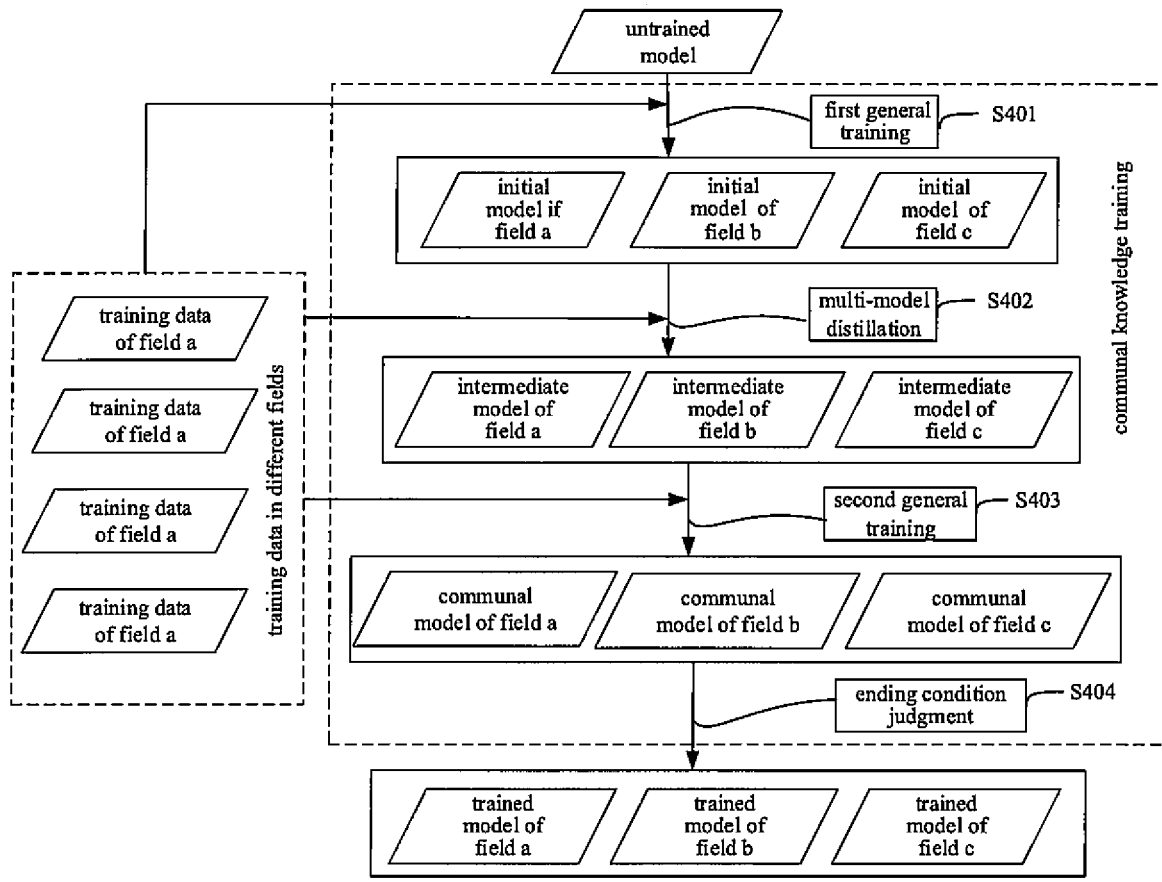
FIG. 4 is a block diagram according to a third embodiment of the present disclosure.

It is illustrated in the above embodiment, that in order to enable the effect of the target reading comprehension model in the second training process to converge, the number of repetitions of the first training process, the second training process, and the action of performing the accuracy rate test on the target reading comprehension model subjected to the second training process may be counted, to improve the effect of the target reading comprehension model in the second training process. In this embodiment, a rate of change between an accuracy rate obtained at a current repetition and an accuracy rate obtained at a previous repetition may also be determined, to improve the effect of the target reading comprehension model. In detail, as illustrated in FIG. 4, the method for training the reading comprehension model may also include the following.

At block S401, a first general training is performed.

In some embodiments of the present disclosure, at least two initial reading comprehension models may be obtained. One of the at least two initial reading comprehension models is trained by employing a first training sample of the reference field to obtain the reference reading comprehension model. The other one of the at least two initial reading comprehension models is trained by using a second training sample of the target field to obtain the target reading comprehension model.

The initial reading comprehension model may be understood as an untrained model.

There may be multiple reference fields. Each reference field corresponds to a reference reading comprehension model. For example, the reference field may include a field a, a field b and a field c. The field a corresponds to a model a1. The field b corresponds to a model b1. The field c corresponds to a model c1.

For example, a training sample of the field a is input into the model a1 for training to obtain an initial reading comprehension model of the field a. A training sample of the field b is input into the model b1 for training to obtain an initial reading comprehension model of the field b. A training sample of the field c is input into the model c1 for training to obtain an initial reading comprehension model of the field c. A training sample of a field d may be input into a model d1 for training to obtain a reading comprehension model of the field d.

At block S402, multi-model distillation is performed.

For example, after the reading comprehension models a1, b1 and c1 are obtained at block S401, the reading comprehension models a1, b1 and c1 have learned the knowledge of the field a, the field b and the field c respectively, thus, the first training samples of the field a, the field b and the field c may be respectively input into the initial reading comprehension models a1, b1 and c1, such that the reading comprehension models a1, b1 and c1 may respectively output first output data. The first output data may be understood as a probability that an answer is at each position in a paragraph provided by the first training sample. The probability is obtained by performing answer prediction, using the reading comprehension models a1, b1 and c1 respectively, on the question provided by the first training sample based on the paragraph provided by the first training sample.

After the reading comprehension model d1 is obtained at block S401, the first training samples of the field a, the field b and the field c may be respectively input into the initial reading comprehension model d1, such that the reading comprehension model d1 outputs the second output data corresponding to the field a, the field b and the field c respectively. The second output data may be understood as a probability that an answer is at each position in a paragraph provided by the first training sample. The probability is obtained by performing answer prediction, using the reading comprehension model d1, on the question provided by the first training sample based on the paragraph provided by the first training sample.

Then, based on a difference between a probability predicated based on the first training sample of the field a by the reading comprehension models a1 and a probability predicated based on the first training sample of the field a by the reading comprehension model d1, a difference between a probability predicated based on the first training sample of the field b by the reading comprehension models b1 and a probability predicated based on the first training sample of the field b by the reading comprehension model d1, and a difference between a probability predicated based on the first training sample in field c by the reading comprehension models c1 and a probability predicated based on the first training sample in field c by the reading comprehension model d1, a model parameter of the reading comprehension model d1 may be adjusted by a training method such as the neural network backpropagation algorithm, such that the probability predicated based on the first training sample in the field a by the reading comprehension model d1 approaches to the probability predicated based on the first training sample of the field a by the reading comprehension models a1, the probability predicated based on the first training sample of the field b by the reading comprehension model d1 approaches to the probability predicated based on the first training sample of the field b by the reading comprehension models b1, and the probability predicated based on the first training sample of the field c by the reading comprehension model d1 approaches to the probability predicated based on the first training sample of the field c by the reading comprehension models c1. The first training process for the reading comprehension model d1 may be completed until the difference between the probabilities is minimum.

It should be noted that, in embodiments of the present disclosure, the multi-model distillation process may be understood as the first training process in the embodiment illustrated in FIG. 3.

At block 403, a second general training is performed.

For example, in embodiments of the present disclosure, in order to improve the effect of the reading comprehension model d1 in the field d, a second training sample of the field d may be input into the reading comprehension model d1 subjected to the first training process. The reading comprehension model d1 subjected to the first training process is trained by using the second training sample of the field d based on the neural network reverse algorithm, such that the trained reading comprehension model d1 is a common model for the field d, the field a, the field b and the field c.

It should be noted that, in embodiments of the present disclosure, the second general training process may be understood as the second training process in the embodiment illustrated in FIG. 3.

At block 404, ending condition is determined.

For example, after the second training process is performed on the reading comprehension model d1 subjected to the first training process, an accuracy rate test may be performed on the reading comprehension model d1 subjected to the second training process to obtain an accuracy rate, and it may be determined whether the accuracy rate obtained by the accuracy rate test reaches a set accuracy threshold.

In a case that the accuracy rate obtained by the accuracy rate test is less than the set accuracy threshold, the first training process, the second training process, and the action of performing the accuracy rate test on the reading comprehension model d1 subjected to the second training process are repeated successively until the accuracy rate obtained reaches the set accuracy threshold.

In order to enable the effect of the reading comprehension model d1 in the second training process not to fluctuate greatly, a rate of change between an accuracy rate obtained at a current repetition and an accuracy rate obtained at a previous repetition may be determined.

For example, repeating the first training process, the second training process, and the action of performing the accuracy rate test on the reading comprehension model d1 subjected to the second training process is stopped in a case that the rate of change is lower than a change rate threshold, and it may be determined that the effect of the reading comprehension model d1 in the second training process does not fluctuate greatly, thereby implementing the second training process of the reading comprehension model d1.

With the method for training the reading comprehension model according to embodiments of the present disclosure, by means of iterative distillation layer by layer, reading comprehension models of multiple reference fields may learn from each other during the iterative process. The target reading comprehension model may absorb data from the multiple reference fields, such that more multi-field data which is most effective for the target reading comprehension model is reserved in the target reading comprehension model, and the method for training the target reading comprehension model may be better than the method simply relying on the training result obtained by the model training data. In a practical application, the target reading comprehension model does not need to change a formed reading comprehension model, nor affects an apparatus and a process applying an existing model, thus the application cost is low.

Figure 5:
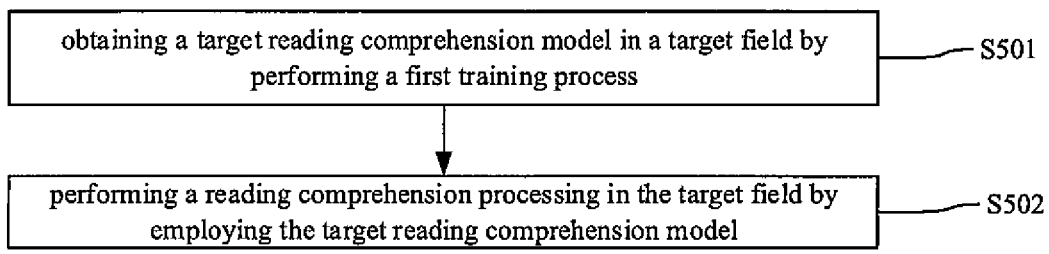
FIG. 5 is a flow chart according to a fourth embodiment of the present disclosure.

In order to enable the skilled in the art more easily to understand the present disclosure, the present disclosure also provides a method for reading comprehension processing. FIG. 5 is a flow chart illustrating a method for reading comprehension processing according to embodiments of the present disclosure. As illustrated in FIG. 5, the method for the reading comprehension processing includes the following.

At block S501, a target reading comprehension model in a target field is obtained by performing a first training process.

Performing the first training process includes: inputting a first training sample of a reference field into a reference reading comprehension model to obtain first output data output by the reference reading comprehension model, inputting the first training sample into an initial reading comprehension model to obtain second output data output by the initial reading comprehension model, and performing model training on the initial reading comprehension model based on a difference between the first output data and the second output data to obtain the target reading comprehension model.

At block S502, a reading comprehension processing is performed in the target field by employing the target reading comprehension model.

With the method for the reading comprehension processing according to embodiments of the present disclosure, the target reading comprehension model in the target field is obtained by performing the first training process, and then the reading comprehension processing is performed in the target field by employing the target reading comprehension model. The target reading comprehension model may be trained by determining the difference between the first output data and the second output data in the first training process, the determined target reading comprehension model may absorb the data in the reference field, such that more multi-domain data which is most effective for the target reading comprehension model is reserved in the target reading comprehension model, and then the effect of the target reading comprehension model subjected to the first training process is improved in an actual production environment or other uses.

Figure 6:
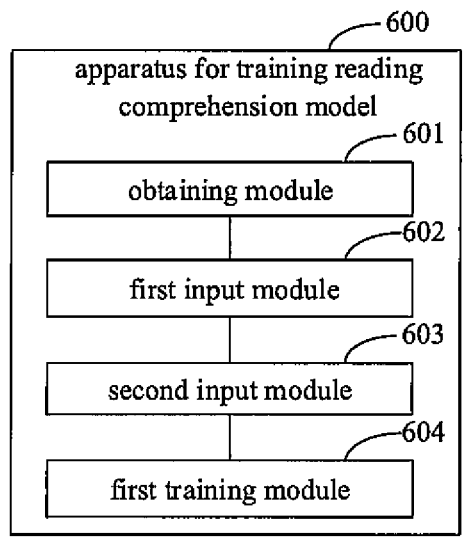
FIG. 6 is a block diagram according to a fifth embodiment of the present disclosure.
Figure 7:
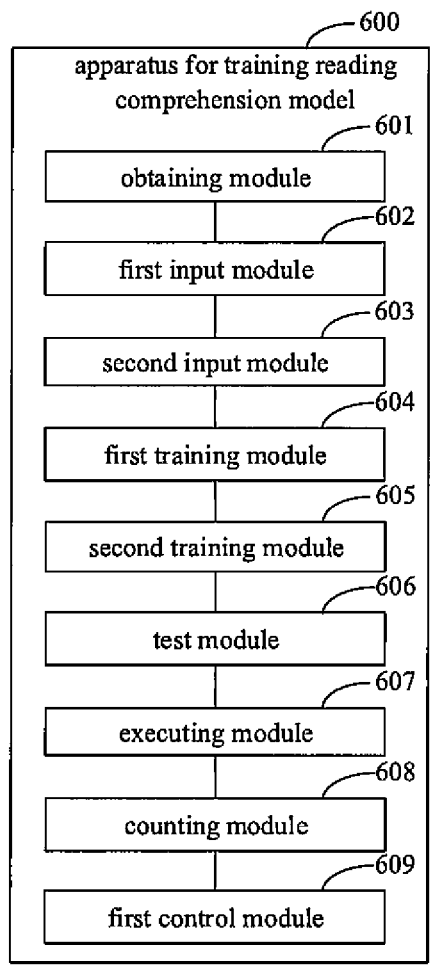
FIG. 7 is a block diagram according to a sixth embodiment of the present disclosure.
Figure 8:
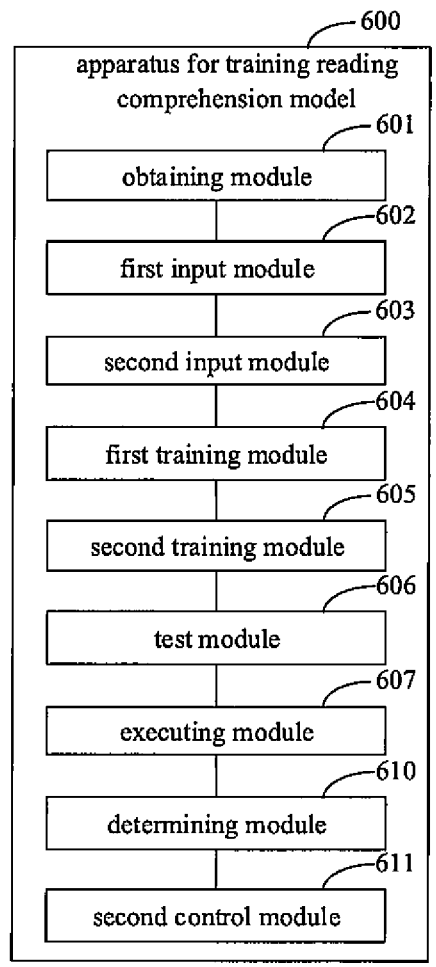
FIG. 8 is a block diagram according to a seventh embodiment of the present disclosure.

Corresponding to the method for training the reading comprehension model according to the above embodiments, embodiments of the present disclosure also provide an apparatus for training a reading comprehension model. Since the apparatus for training the reading comprehension model according to this embodiment corresponds to the method for training the reading comprehension model according to the above embodiments, the embodiments of the method for training the reading comprehension model are also applicable to the apparatus for training the reading comprehension model according to this embodiment, which are not elaborated herein. FIGS. 6-8 are block diagrams illustrating an apparatus for training a reading comprehension model according to embodiments of the present disclosure.

As illustrated in FIG. 6, the apparatus 600 for training the reading comprehension model includes: an obtaining module 601, a first input module 602, a second input module 603, and a first training module 604.

The obtaining module 601 is configured to obtain a target reading comprehension model of a target field and a reference reading comprehension model of a reference field. As some embodiments of the present disclosure, the obtaining module includes: an obtaining unit, a first training unit, and a second training unit. The obtaining unit is configured to obtain at least two initial reading comprehension models. The first training unit is configured to train one of the at least two initial reading comprehension models by employing a first training sample of the reference field to obtain the reference reading comprehension model. The second training unit is configured to train the other of the at least two initial reading comprehension models by employing a second training sample of the target field to obtain the target reading comprehension model.

The first input module 602 is configured to input the first training sample of the reference field into the reference reading comprehension model to obtain first output data output by the reference reading comprehension model.

The second input module 603 is configured to input the first training sample into the target reading comprehension model to obtain second output data output by the target reading comprehension model.

The first training module 604 is configured to perform a first training process on the target reading comprehension model based on a difference between the first output data and the second output data.

In embodiments of the present disclosure, the apparatus for training the reading comprehension model may also include a second training module 605, a test module 606, and an executing module 607. The second training module 605 is configured to perform a second training process on the target reading comprehension model subjected to the first training process based on a second training sample of the target field. The test module 606 is configured to perform an accuracy rate test on the target reading comprehension model subjected to the second training process. The executing module 607 is configured to, in a case that an accuracy rate obtained by the accuracy rate test is less than a set accuracy threshold, repeat the first training process, the second training process, and the action of performing the accuracy rate test on the target reading comprehension model subjected to the second training process successively until the accuracy rate obtained reaches the set accuracy threshold.

In embodiments of the present disclosure, the apparatus 600 for training the reading comprehension model may also include: a counting module 608 and a first control module 609. The counting module 608 is configured to count a number of repetitions of the first training process, the second training process, and the action of performing the accuracy rate test on the target reading comprehension model subjected to the second training process. The first control module 609 is configured to stop repeating the first training process, the second training process, and the action of performing the accuracy rate test on the target reading comprehension model subjected to the second training process in a case that the number of repetitions reaches a number threshold.

In embodiments of the present disclosure, the apparatus 600 for training the reading comprehension model may also include: a determining module 610, and a second control module 611. The determining module 610 is configured to, for an accuracy rate obtained at a current repetition, determine a rate of change between the accuracy rate obtained at the current repetition and an accuracy rate obtained at a previous repetition. The second control module 611 is configured to stop repeating the first training process, the second training process, and the action of performing the accuracy rate test on the target reading comprehension model subjected to the second training process in a case that the rate of change is lower than a change rate threshold.

With the apparatus for training the reading comprehension model according to embodiments of the present disclosure, the target reading comprehension model of the target field and the reference reading comprehension model of the reference field are obtained. The first training sample of the reference field is input into the reference reading comprehension model to obtain the first output data output by the reference reading comprehension model, and the first training sample is input into the target reading comprehension model to obtain the second output data output by the target reading comprehension model. The first training process is performed on the target reading comprehension model based on the difference between the first output data and the second output data. In this way, by determining the difference between the first output data and the second output data, it may be determined that the target reading comprehension model may absorb data of the reference field, such that more multi-field data which is most effective for the target reading comprehension model may be reserved in the target reading comprehension model, and the method for training the reading comprehension model may be better than a method simply relying on a training result obtained by employing the model training data.

Figure 9:
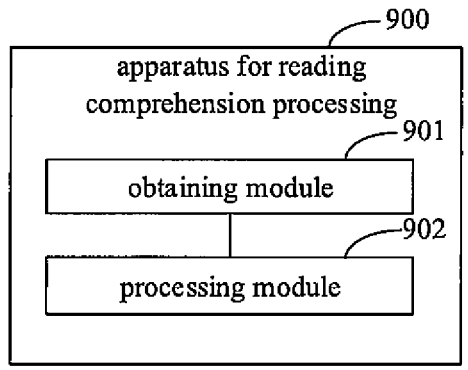
FIG. 9 is a block diagram according to an eighth embodiment of the present disclosure.

Corresponding to the method for reading comprehension processing according to the above embodiments, embodiments of the present disclosure also provide an apparatus for reading comprehension processing. Since the apparatus for the reading comprehension processing according to this embodiment corresponds to the method for the reading comprehension processing according to the above embodiments, the embodiments of the method for the reading comprehension processing are also applicable to the apparatus for the reading comprehension processing according to this embodiment, which are not elaborated herein. FIG. 9 is a block diagram illustrating an apparatus for reading comprehension processing according to embodiments of the present disclosure.

As illustrated in FIG. 9, the apparatus 900 for the reading comprehension processing includes: an obtaining module 901 and a processing module 902.

The obtaining module 901 is configured to obtain a target reading comprehension model in a target field by performing a first training process. Performing the first training process includes: inputting a first training sample of a reference field into a reference reading comprehension model to obtain first output data output by the reference reading comprehension model, inputting the first training sample into an initial reading comprehension model to obtain second output data output by the initial reading comprehension model, and performing model training on the initial reading comprehension model based on a difference between the first output data and the second output data to obtain the target reading comprehension model.

The processing module 902 is configured to perform a reading comprehension processing in the target field by employing the target reading comprehension model.

With the apparatus for the reading comprehension processing according to embodiments of the present disclosure, the target reading comprehension model in the target field by performing the first training process is obtained, and then the reading comprehension processing is performed in the target field by employing the target reading comprehension model. The target reading comprehension model in the first training process in the apparatus may determine that the target reading comprehension model may absorb the data in the reference field by determining the difference between the first output data and the second output data, such that more multi-field data which is most effective for the target reading comprehension model is reserved in the target reading comprehension model, and then the effect of the target reading comprehension model subjected to the first training process is improved in an actual production environment or other uses.

According to embodiments of the present disclosure, the present disclosure also provides an electronic device and a readable storage medium.

Figure 10:
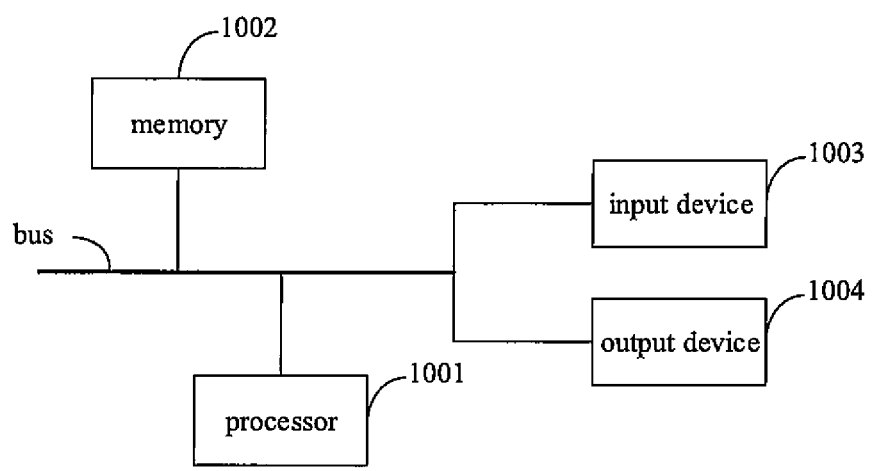
FIG. 10 is a block diagram illustrating an electronic device capable of implementing a method for training a reading comprehension model according to embodiments of the present disclosure.

As illustrated in FIG. 10, FIG. 10 is a block diagram illustrating an electronic device capable of implementing a method for training a reading comprehension model according to embodiments of the present disclosure. The electronic device aims to represent various forms of digital computers, such as a laptop computer, a desktop, computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the present disclosure described and/or claimed herein.

As illustrated in FIG. 10, the electronic device includes: one or more processors 1001, a memory 1002, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 10, a processor 1001 is taken as an example.

The memory 1002 is a non-transitory computer readable storage medium provided by the present disclosure. The memory is configured to store instructions executable by at least one processor, to enable the at least one processor to execute the method for training the reading comprehension model provided by the present disclosure. The non-transitory computer readable storage medium provided by the present disclosure is configured to store computer instructions. The computer instructions are configured to enable a computer to execute the method for training the reading comprehension model provided by the present disclosure.

As the non-transitory computer readable storage medium, the memory 1002 may be configured to store non-transitory software programs, non-transitory computer executable programs and modules, such as program instructions/module (such as the obtaining module 601, the first input module 602, the second input module 603, and the first training module 604 illustrated in FIG. 6) corresponding to the method for training the reading comprehension model according to embodiments of the present disclosure. The processor 1001 is configured to execute various functional applications and data processing of the server by operating non-transitory software programs, instructions and modules stored in the memory 1002, that is, implements the method for training the reading comprehension model according to the above method embodiments.

The memory 1002 may include a storage program region and a storage data region. The storage program region may store an application required by an operating system and at least one function. The storage data region may store data created according to predicted usage of the electronic device based on the semantic representation. In addition, the memory 1002 may include a high-speed random access memory, and may also include a non-transitory memory, such as at least one disk memory device, a flash memory device, or other non-transitory solid-state memory device. In some embodiments, the memory 1002 may optionally include memories remotely located to the processor 1001, and these remote memories may be connected to the electronic device via a network. Examples of the above network include, but are not limited to, an Internet, an intranet, a local area network, a mobile communication network and combinations thereof.

The electronic device capable of implementing the method for training the reading comprehension model may also include: an input device 1003 and an output device 1004. The processor 1001, the memory 1002, the input device 1003, and the output device 1004 may be connected via a bus or in other means. In FIG. 10, the bus is taken as an example.

The input device 1003 may receive inputted digital or character information, and generate key signal input related to user setting and function control of the electronic device capable of implementing the method for training the reading comprehension model, such as a touch screen, a keypad, a mouse, a track pad, a touch pad, an indicator stick, one or more mouse buttons, a trackball, a joystick and other input device. The output device 1004 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

With the technical solution according to embodiments of the present disclosure, the target reading comprehension model of the target field and the reference reading comprehension model of the reference field are obtained. The first training sample of the reference field is input into the reference reading comprehension model to obtain the first output data output by the reference reading comprehension model, and the first training sample is input into the target reading comprehension model to obtain the second output data output by the target reading comprehension model. The first training process is performed on the target reading comprehension model based on the difference between the first output data and the second output data. In this way, by determining the difference between the first output data and the second output data, it may be determined that the target reading comprehension model may absorb data of the reference field, such that the method for training the reading comprehension model may be better than a method simply relying on a training result obtained by employing the model training data.

It should be understood that, steps may be reordered, added or deleted by utilizing flows in the various forms illustrated above. For example, the steps described in the present disclosure may be executed in parallel, sequentially or in different orders, so long as desired results of the technical solution disclosed in the present disclosure may be achieved, there is no limitation here.

The above detailed implementations do not limit the protection scope of the present disclosure. It should be understood by the skilled in the art that various modifications, combinations, sub-combinations and substitutions may be made based on design requirements and other factors. Any modification, equivalent substitution and improvement made within the spirit and the principle of the present disclosure shall be included in the protection scope of present disclosure.

What is claimed is:

1. A method for training a reading comprehension model, comprising:
    obtaining a target reading comprehension model of a target field and a reference reading comprehension model of a reference field;
    inputting a first training sample of the reference field into the reference reading comprehension model to obtain first output data output by the reference reading comprehension model;
    inputting the first training sample into the target reading comprehension model to obtain second output data output by the target reading comprehension model;
    performing a first training process on the target reading comprehension model based on a difference between the first output data and the second output data;
    performing a second training process on the target reading comprehension model subjected to the first training process based on a second training sample of the target field;
    performing an accuracy rate test on the target reading comprehension model subjected to the second training process;
    in a case that an accuracy rate obtained by the accuracy rate test is less than a set accuracy threshold, repeating the first training process, the second training process, and the action of performing the accuracy rate test on the target reading comprehension model subjected to the second training process successively until the accuracy rate obtained reaches the set accuracy threshold;
    counting a number of repetitions of the first training process, the second training process, and the action of performing the accuracy rate test on the target reading comprehension model subjected to the second training process; and
    stopping repeating the first training process, the second training process, and the action of performing the accuracy rate test on the target reading comprehension model subjected to the second training process in a case that the number of repetitions reaches a number threshold.

2. The method of claim 1, after repeating the first training process, the second training process, and the action of performing the accuracy rate test on the target reading comprehension model subjected to the second training process successively until the accuracy rate obtained reaches the set accuracy threshold, further comprising:
    for an accuracy rate obtained at a current repetition, determining a rate of change between the accuracy rate obtained at the current repetition and an accuracy rate obtained at a previous repetition; and
    stopping repeating the first training process, the second training process, and the action of performing the accuracy rate test on the target reading comprehension model subjected to the second training process in a case that the rate of change is lower than a change rate threshold.

3. The method of claim 1, wherein obtaining the target reading comprehension model of the target field and the reference reading comprehension model of the reference field comprises:
obtaining at least two initial reading comprehension models;
training one of the at least two initial reading comprehension models by employing the first training sample of the reference field to obtain the reference reading comprehension model;
training the other of the at least two initial reading comprehension models by employing a second training sample of the target field to obtain the target reading comprehension model.

4. The method of claim 1, wherein the reference field comprises a plurality of reference fields, and each reference field corresponds to a reference reading comprehension model.

5. An electronic device, comprising:
at least one processor; and
a memory, communicatively coupled to the at least one processor,
wherein the memory is configured to store instructions executable by the at least one processor, and when the instructions are executed by the at least one processor, the at least one processor is caused to implement a method for training the reading comprehension model, the method comprising:
obtaining a target reading comprehension model of a target field and a reference reading comprehension model of a reference field;
inputting a first training sample of the reference field into the reference reading comprehension model to obtain first output data output by the reference reading comprehension model;
inputting the first training sample into the target reading comprehension model to obtain second output data output by the target reading comprehension model;
performing a first training process on the target reading comprehension model based on a difference between the first output data and the second output data;
performing a second training process on the target reading comprehension model subjected to the first training process based on a second training sample of the target field;
performing an accuracy rate test on the target reading comprehension model subjected to the second training process;
in a case that an accuracy rate obtained by the accuracy rate test is less than a set accuracy threshold, repeating the first training process, the second training process, and the action of performing the accuracy rate test on the target reading comprehension model subjected to the second training process successively until the accuracy rate obtained reaches the set accuracy threshold;
counting a number of repetitions of the first training process, the second training process, and the action of performing the accuracy rate test on the target reading comprehension model subjected to the second training process; and
stopping repeating the first training process, the second training process, and the action of performing the accuracy rate test on the target reading comprehension model subjected to the second training process in a case that the number of repetitions reaches a number threshold.

6. The electronic device of claim 5, wherein, after repeating the first training process, the second training process, and the action of performing the accuracy rate test on the target reading comprehension model subjected to the second training process successively until the accuracy rate obtained reaches the set accuracy threshold, the method further comprises:
for an accuracy rate obtained at a current repetition, determining a rate of change between the accuracy rate obtained at the current repetition and an accuracy rate obtained at a previous repetition; and
stopping repeating the first training process, the second training process, and the action of performing the accuracy rate test on the target reading comprehension model subjected to the second training process in a case that the rate of change is lower than a change rate threshold.

7. The electronic device of claim 5, wherein obtaining the target reading comprehension model of the target field and the reference reading comprehension model of the reference field comprises:
obtaining at least two initial reading comprehension models;
training one of the at least two initial reading comprehension models by employing the first training sample of the reference field to obtain the reference reading comprehension model;
training the other of the at least two initial reading comprehension models by employing a second training sample of the target field to obtain the target reading comprehension model.

8. The electronic device of claim 5, wherein the reference field comprises a plurality of reference fields, and each reference field corresponds to a reference reading comprehension model.

9. A non-transitory computer readable storage medium having computer instructions stored thereon, wherein the computer instructions are configured to cause a computer to execute the method for training a reading comprehension model, the method comprising:
obtaining a target reading comprehension model of a target field and a reference reading comprehension model of a reference field;
inputting a first training sample of the reference field into the reference reading comprehension model to obtain first output data output by the reference reading comprehension model;
inputting the first training sample into the target reading comprehension model to obtain second output data output by the target reading comprehension model;
performing a first training process on the target reading comprehension model based on a difference between the first output data and the second output data;
performing a second training process on the target reading comprehension model subjected to the first training process based on a second training sample of the target field;
performing an accuracy rate test on the target reading comprehension model subjected to the second training process;
in a case that an accuracy rate obtained by the accuracy rate test is less than a set accuracy threshold, repeating the first training process, the second training process, and the action of performing the accuracy rate test on the target reading comprehension model subjected to the second training process successively until the accuracy rate obtained reaches the set accuracy threshold;

counting a number of repetitions of the first training process, the second training process, and the action of performing the accuracy rate test on the target reading comprehension model subjected to the second training process; and stopping repeating the first training process, the second training process, and the action of performing the accuracy rate test on the target reading comprehension model subjected to the second training process in a case that the number of repetitions reaches a number threshold.

10. The storage medium of claim 9, wherein, after repeating the first training process, the second training process, and the action of performing the accuracy rate test on the target reading comprehension model subjected to the second training process successively until the accuracy rate obtained reaches the set accuracy threshold, the method further comprises:

for an accuracy rate obtained at a current repetition, determining a rate of change between the accuracy rate obtained at the current repetition and an accuracy rate obtained at a previous repetition; and stopping repeating the first training process, the second training process, and the action of performing the accuracy rate test on the target reading comprehension model subjected to the second training process in a case that the rate of change is lower than a change rate threshold.

11. The storage medium of claim 9, wherein obtaining the target reading comprehension model of the target field and the reference reading comprehension model of the reference field comprises:

obtaining at least two initial reading comprehension models;

training one of the at least two initial reading comprehension models by employing the first training sample of the reference field to obtain the reference reading comprehension model;

training the other of the at least two initial reading comprehension models by employing a second training sample of the target field to obtain the target reading comprehension model.

12. The storage medium of claim 9, wherein the reference field comprises a plurality of reference fields, and each reference field corresponds to a reference reading comprehension model.

\* \* \* \* \*